United States Patent
Faken et al.

(10) Patent No.: US 8,040,345 B2
(45) Date of Patent: Oct. 18, 2011

(54) SYSTEMS FOR HYBRID GEOMETRIC/VOLUMETRIC REPRESENTATION OF 3D OBJECTS

(75) Inventors: Daniel Faken, Peabody, MA (US); Craig Cook, Wayland, MA (US); Brad Amidon, Arlington, MA (US); Brandon Itkowitz, Sunnyvale, CA (US); Scott Davidson, Jamaica Plain, MA (US); Vincent M. Hammer, Milton, VT (US)

(73) Assignee: SensAble Technologies, Inc., Wilmington, MA (US)

( * ) Notice: Subject to any disclaimer, the term of this patent is extended or adjusted under 35 U.S.C. 154(b) by 869 days.

(21) Appl. No.: 11/998,877

(22) Filed: Nov. 30, 2007

(65) Prior Publication Data

US 2008/0246761 A1    Oct. 9, 2008

Related U.S. Application Data

(60) Provisional application No. 60/872,542, filed on Nov. 30, 2006.

(51) Int. Cl.
*G06T 17/00* (2006.01)

(52) U.S. Cl. ........................................................ 345/420
(58) Field of Classification Search .................... 345/420
See application file for complete search history.

(56) References Cited

U.S. PATENT DOCUMENTS

| | | | |
|---|---|---|---|
| 6,867,770 B2 | 3/2005 | Payne | |
| 6,958,752 B2 | 10/2005 | Jennings, Jr. et al. | |
| 7,095,418 B2 | 8/2006 | Levene et al. | |
| 7,149,596 B2 | 12/2006 | Berger et al. | |
| 7,212,203 B2 | 5/2007 | Payne | |
| 7,382,378 B2 | 6/2008 | Levene et al. | |
| 7,400,331 B2 | 7/2008 | Levene et al. | |
| 7,626,589 B2 | 12/2009 | Berger | |
| 7,710,415 B2 | 5/2010 | Jennings, Jr. et al. | |
| 7,808,509 B2 | 10/2010 | Levene et al. | |
| 7,889,209 B2 | 2/2011 | Berger et al. | |
| 2002/0089500 A1* | 7/2002 | Jennings et al. | .............. 345/420 |

FOREIGN PATENT DOCUMENTS

EP    1241630 A2    9/2002

OTHER PUBLICATIONS

Kim, Laehyun, Gaurav S. Sukhatme, and Mathieu Desbrun. "A Haptic-Rendering Technique Based on Hybrid Surface Representation." Computer Graphics and Applications, IEEE 24.2 (Mar. 2004): 66-75.*

Hua, Jing, and Hong Qin. "Haptics-Based Dynamic Implicit Solid Modeling." IEEE Transactions on Visualizations and Computer Graphics 10.6 (2004): 1-13.*

(Continued)

*Primary Examiner* — Xiao Wu
*Assistant Examiner* — Scott E Sonners
(74) *Attorney, Agent, or Firm* — Goodwin Procter LLP (57) ABSTRACT

The invention provides a system for modeling three-dimensional objects using hybrid geometric/volumetric representation, wherein sharp edges are created by a geometric representation that is connected to the volumetric representation. The system creates, maintains, and updates the hybrid representation according to user input. The system also provides for conversion of the hybrid representation into either a wholly geometric representation or a wholly volumetric representation, as may be needed for output to a given device, such as a display device, a printer, and/or a fabricating device.

22 Claims, 10 Drawing Sheets

OTHER PUBLICATIONS

Chen, Kwong-Wai, Pheng-Ann Heng, and Hanqiu Sun. "Direct Haptic Rendering of Isosurface by Intermediate Representation." VRST '00 Proceedings of the ACM Symposium on Virtual Reality Software and Technology (2000): 188-94.*

Kim, Laehyun, and Se Hyung Park. "Haptic Interaction and Volume Modeling Techniques for Realistic Dental Simulation." The Visual Computer 22.2 (2006): 90-98.*

Hua, Qin, "Haptics-Based Dynamic Implicit Solid Modeling," IEEE Trans. on Visualization and Computer Graphics, vol. 10., No. 5., Sep./Oct. 2004, 14 pages.

Kim, Laehyun, et al., "An Implicit-Based Haptic Rendering Technique," http://www.geometry.caltech.edu/pubs/KKSD02.pdf., 6 pages.

Gibson, Sarah F. Frisken, "Beyond Volume Rendering: Visualization, Haptic Exploration, and Physical Modeling of Voxel-based Objects," Mitsibushi Electric Research Laboratories, Technical Report 95-04, Jan. 31, 1995, 14 pages.

International Search Report and Written Opinion for PCT/US2007/24648 dated Apr. 10, 2008, 8 pages.

SensAble Technologies, XP002473921 "Programmers Guide," Openhaptics Toolkit, vol. 2, Aug. 2005, 19 pages.

* cited by examiner

SYSTEMS FOR HYBRID GEOMETRIC/VOLUMETRIC REPRESENTATION OF 3D OBJECTS

RELATED APPLICATIONS

This application claims priority to and benefit of U.S. Provisional Patent Application No. 60/872,542, filed Nov. 30, 2006, the text of which is incorporated herein by reference, in its entirety.

FIELD OF THE INVENTION

This invention relates generally to systems, methods, and apparatus for haptic modeling. More particularly, in certain embodiments, the invention relates to systems for modeling three dimensional objects using a hybrid geometric/volumetric representation.

BACKGROUND OF THE INVENTION

Figure 1:
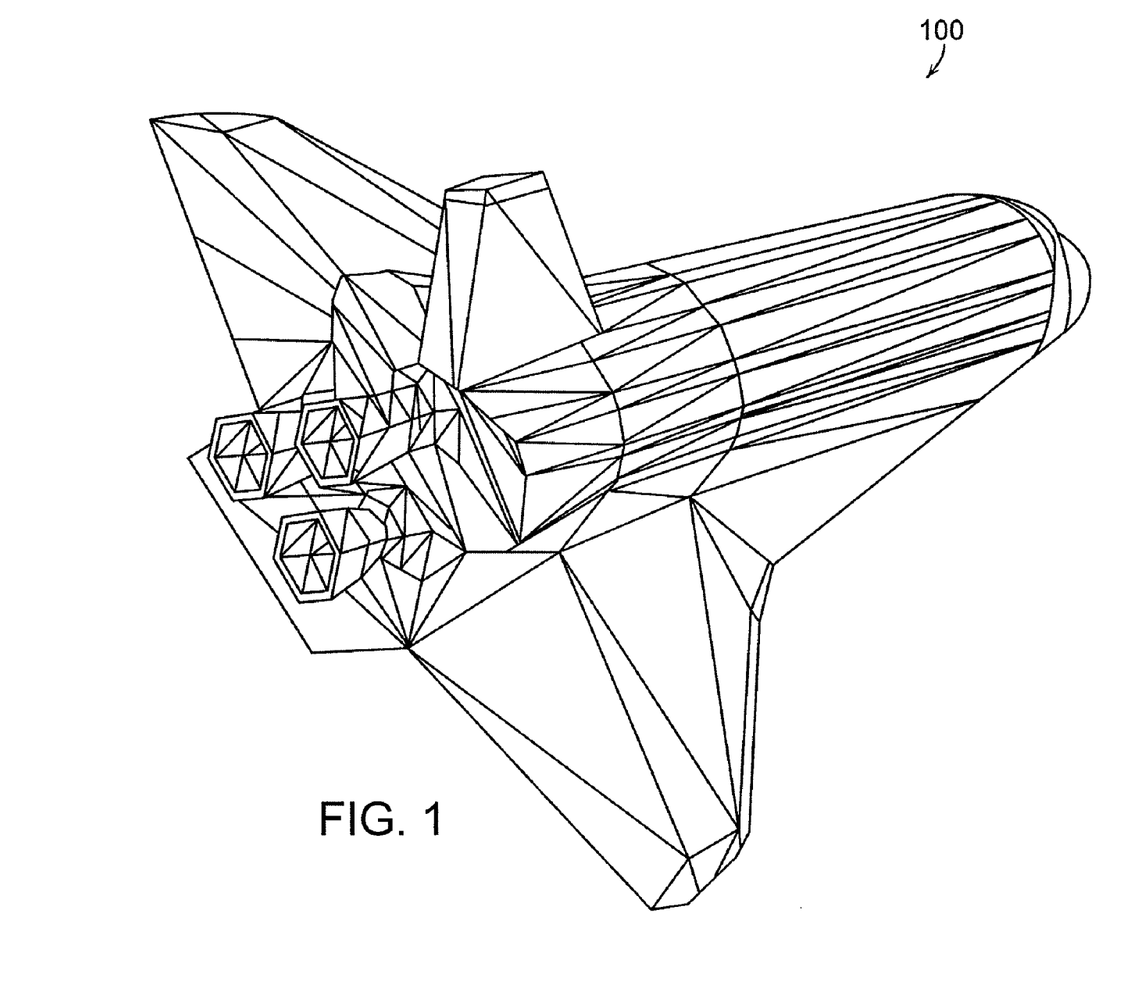
FIG. 1 shows a geometric representation of a space shuttle composed entirely of polygons.

Traditional modeling systems operate in either the geometric domain or in the volumetric (quantized) domain. Geometric models are generally built using lines, polygons, NURBS, and the like. FIG. 1 incorporated herein shows a geometric representation of a space shuttle 100 composed of polygons. Geometric representations are excellent for modeling objects that can be characterized with simple geometric forms. However, geometric representations are not as effective for modeling more organic, realistic, and/or complex shapes.

Voxel-based models offer advantages in both graphical and haptic representation of three-dimensional objects, particularly objects having complex shapes that cannot be easily characterized with simple geometric forms such as lines, polygons, spheres, cylinders, or the like. Voxel-based models offer significant speed and other processing advantages for production of realistic force-feedback to a user in a haptic virtual reality system. However, voxel-based models are not as effective as geometric models at representing objects with sharp edges.

Traditional modeling systems do not combine both volumetric and geometric representations, and do not have the ability to perform operations in one domain (volumetric or geometric) and have the results reflected in the other domain. This restricts the utility of such modeling systems in applications that require both industrial design (e.g., design of man-made, man-altered, and/or linear forms) and organic modeling (e.g., modeling non-linear, complex forms that appear in nature).

SUMMARY OF THE INVENTION

The invention provides a system for modeling three-dimensional objects using a hybrid geometric/volumetric representation, wherein sharp edges are created by a geometric representation that is connected to the volumetric representation. This dual representation allows the user to work in either domain and move smoothly and seamlessly between them.

Hybrid representations are of significant advantage in both haptic and graphical modeling of complex objects. For example, systems for hybrid representation of 3D objects, as described herein, may be effectively used in dental restoration to design and fabricate synthetic prostheses configured specifically to existing patient anatomy. The model is a true hybrid representation, in that there is no loss introduced by converting one geometric representation to another representation. All the accuracy of both the geometric and volumetric representations is preserved, and the representations are combined seamlessly in a post-process.

The hybrid representations are particularly advantageous for haptic systems which make use of quantized volumetric models that facilitate sculpting of the virtual object, removal of virtual material from the virtual object, addition of virtual material to the virtual object, warping or tugging of the virtual object, translation (moving) of the virtual object, rotation of the virtual object, and other manipulation of the virtual object.

The system provides for creating, maintaining, and updating the hybrid representation according to user input. The system also provides for conversion of the hybrid representation into either a wholly geometric representation or a wholly volumetric representation, as may be needed for output to a given device, such as a display device, a printer, and/or a fabricating device, e.g., a desk-top mill.

In one aspect, the invention is directed to a system for creating a hybrid representation of a three-dimensional object having one or more sharp edges. The system includes a user-controlled haptic interface device configured to provide a user input to a computer and to transmit force to a user according to a user interface location in a virtual environment. Coded instructions, when operating with the computer and the user input, are configured to generate a haptic representation of the three-dimensional object in the virtual environment, wherein the haptic representation is a hybrid representation comprising a volumetric representation and a geometric representation. The geometric representation defines at least one edge of the hybrid representation. The coded instructions are further configured to determine a force transmitted to the user via the haptic interface device according to an interaction by the user with the three-dimensional object in the virtual environment. Elements of other aspects of this invention, as described elsewhere herein, may be used in this aspect of the invention as well.

In certain embodiments, the volumetric representation comprises (includes) a voxel-based representation. The geometric representation may comprise a resolution-independent geometric representation, for example, a NURBS representation. The geometric representation may also comprise a resolution-dependent geometric representation, for example, a polyline representation, a mesh representation, a polygon representation, and/or a polyhedral representation.

The hybrid representation may comprise polygons connected to a voxel representation to provide at least one sharp edge. The user interaction may comprise at least one of the following: creation of the three-dimensional object, manipulation of the three-dimensional object, interaction with the three-dimensional object, and editing of the three-dimensional object.

The coded instructions may be configured to convert the hybrid representation into a wholly geometric or wholly volumetric representation for output to a display device, a printer, and/or a fabricating device. The coded instructions may be further configured to display the hybrid representation and/or provide output data for printing and/or fabrication of said hybrid representation.

In another aspect, the invention is directed to an apparatus for creating a hybrid representation of a three-dimensional object. The apparatus includes a haptic interface device and a memory upon which machine-readable code is stored. The code defines a set of instructions for generating a haptic representation of the three-dimensional object in a virtual environment, wherein the haptic representation is a hybrid representation comprising a volumetric representation and a geometric representation. The geometric representation defines at least one edge of the hybrid representation. The code also defines a set of instructions for determining force transmitted to a user via the haptic interface device according to an interaction by the user with the three-dimensional object in the virtual environment. Elements of other aspects of this invention, as described elsewhere herein, may be used in this aspect of the invention as well.

In certain embodiments, the volumetric representation comprises (includes) a voxel-based representation. The geometric representation may comprise a resolution-independent geometric representation, for example, a NURBS representation. The geometric representation may also comprise a resolution-dependent geometric representation, for example, a polyline representation, a mesh representation, a polygon representation, and/or a polyhedral representation.

The hybrid representation may comprise polygons connected to a voxel representation to provide at least one sharp edge. The user interaction may comprise at least one of the following: creation of the three-dimensional object, manipulation of the three-dimensional object, interaction with the three-dimensional object, and editing of the three-dimensional object.

The coded instructions may be configured to convert the hybrid representation into a wholly geometric or wholly volumetric representation for output to a display device, a printer, and/or a fabricating device. The coded instructions may be further configured to display the hybrid representation and/or provide output data for printing and/or fabrication of said hybrid representation.

In another aspect, the invention is directed to a system for creating, maintaining, updating, and/or editing a hybrid representation including quantized (e.g., volumetric) representations and resolution-independent geometric representations and/or resolution-dependent geometric representations of edges, surfaces, and/or solids. In certain embodiments, the system allows a human operator to work in either the quantized (volumetric) or the geometric portions and switch between them. In certain embodiments, the system converts the hybrid representation into a wholly geometric representation or a wholly volumetric representation for output to a device that deals exclusively with one representation or the other. Elements of other aspects of this invention, as described elsewhere herein, may be used in this aspect of the invention as well.

In certain embodiments, the system uses NURBS for resolution-independent geometric representation. In certain embodiments, the system uses voxels for quantized (e.g., volumetric) representation. In certain embodiments, the system uses polylines, meshes, polygons, and/or polyhedra (these are examples of geometric representations) to represent resolution-dependent edges, surfaces, and/or solids.

In certain embodiments, the system is configured to convert between the edge, surface, and solids representations as necessary for creation, editing, and output to specific devices.

BRIEF DESCRIPTION OF THE DRAWINGS

In the drawings, like reference characters generally refer to the same features throughout the different views. Also, the drawings are not necessarily to scale, emphasis instead being placed upon illustrating the principles of the invention.

DETAILED DESCRIPTION

Throughout the description, where processes, systems, and methods are described as having, including, or comprising specific steps and/or components, it is contemplated that, additionally, there are processes, systems, and methods according to the present invention that consist essentially of, or consist of, the recited steps and/or components.

It should be understood that the order of steps or order for performing certain actions is immaterial so long as the invention remains operable. Moreover, two or more steps or actions may be conducted simultaneously.

The systems may include a PHANTOM® force-feedback device, for example, the PHANTOM® force-feedback device manufactured by SensAble Technologies, Inc., of Woburn, Mass., providing the operator with 3D navigation and the ability to use his/her sense of touch to model quickly and accurately with virtual clay. The operator can create original 3D models or use the systems with STL data from scanners or existing medical and dental software, for example. For example, CT/MRI scans (or any other scans) that have been converted to STL data can also be used. Files can be exported for Rapid Prototyping (RP) or milling, and CAD/CAM, for example.

Voxels are found herein to be superior for sculpting and carving virtual objects with organic shapes, such as teeth, bridges, implants, and the like. The system provides a hybrid representation, for example, a combination of voxel-based representation with one or more other types of data representation, for example, geometric representation (e.g., point clouds, meshes, NURBS surfaces, polygons, polyhedra, and/ or the like), such that the benefit of voxel representation in sculpting and carving can be achieved, while the benefit of the geometric data representation is additionally achieved.

In certain embodiments, the system provides a mixed representation in an editing model, for example, using NURBS curves, polygonal objects such as triangles, and voxels, together in the editing model, to represent the object. This goes beyond simply import/export of polygonal, geometric, and NURBS items into/from a purely voxel-based editing model. Here, the editing model itself comprises the mixed representation, allowing seamless creation, editing, interaction, and/or manipulation by the user.

U.S. Pat. No. 6,084,587, commonly-owned by the assignee of this patent application and incorporated by reference herein in its entirety, describes user selection of both geometric and volumetric representations in a set of sub-constructs. U.S. Pat. No. 7,102,635, commonly-owned by the assignee of this patent application and incorporated by reference herein in its entirety, describes conversion between surface representation and volumetric representation. The system of the present application further describes seamless user interaction, creation, and/or editing of a mixed mode representation. In one example, the mixed mode allows a deficiency in one mode (e.g., inability of a voxel-based representation to model a sharp edge) to be overcome by another mode (e.g., representation of the sharp edge by precise geometric objects such as a NURBS curve).

One particular embodiment of the system for hybrid geometric/volumetric representation of a 3D object is a system that adds a sharp edge to a volumetrically-defined (e.g., voxel-based) solid using a geometric curve (e.g., NURBS curve) and polygons. U.S. Pat. No. 7,102,635 describes a voxel-based modeling approach (see, for example, column 17 to column 18). A voxel-based model of a solid has "facets" at its corners, which result from the discretization of model data when converted to voxels.

Figure 2:
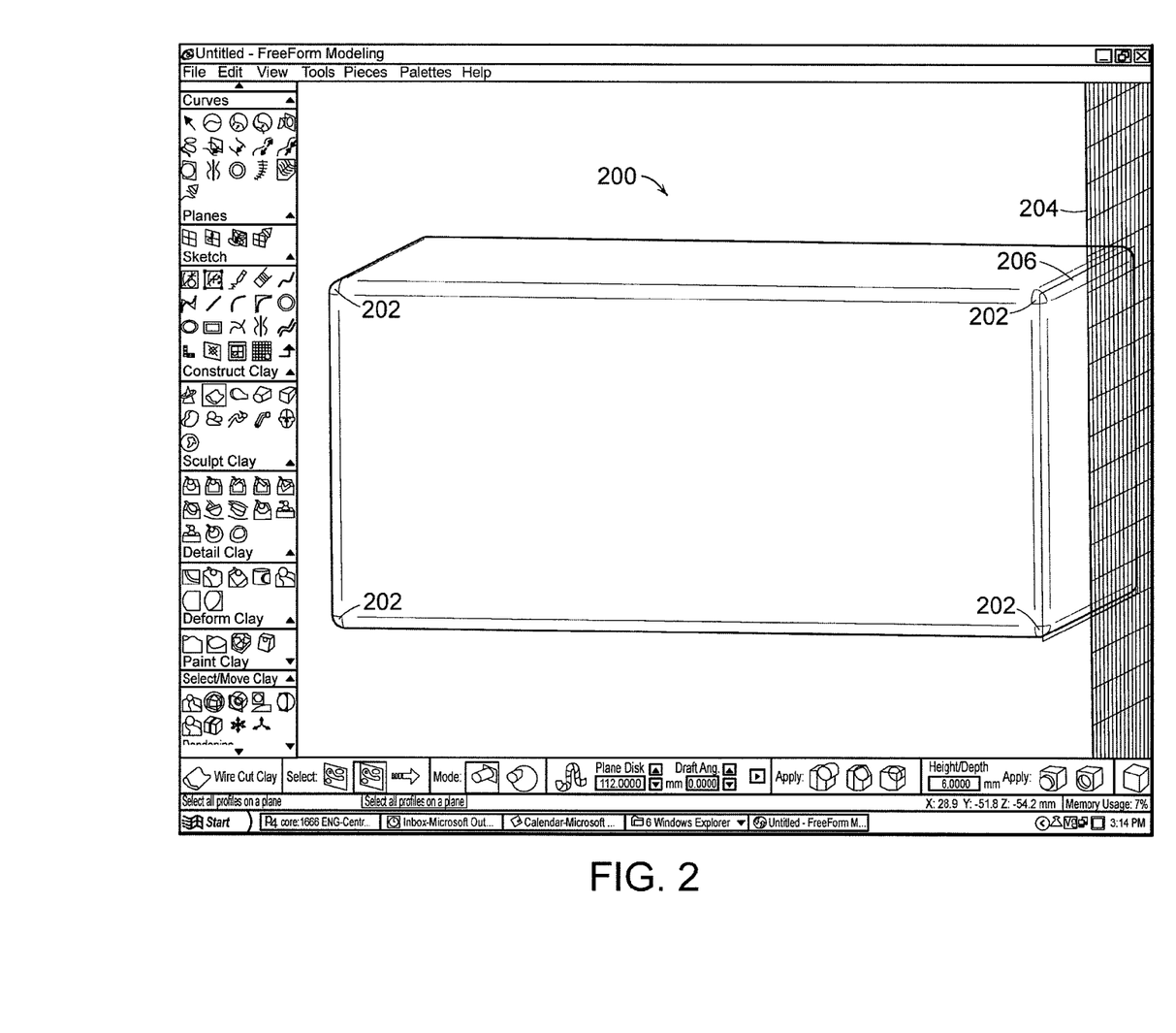
FIG. 2 is a screenshot from 3D haptic/graphical modeling software showing a virtual object (a solid) with a purely voxel-based representation, in a virtual environment, where the voxel-based model has facets at its corners resulting from the discretization of model data when converted to voxels.

This is seen, for example, in the screenshot 200 of FIG. 2, at the corners 202 of the virtual object. The virtual object seen in FIG. 2 is a purely voxel-based representation produced from a "wirecut" operation (a rectangle constructed from virtual clay based on a planar rectangular sketch curve). A square "sharpening" curve (e.g., the NURBS curve defining the edge 206 in the plane of the mesh 204 of FIG. 2) can be used as a guide. Polygons, for example, triangles, are added to the model to fill in the gap between the discrete voxel representation (the virtual clay surface) and the desired NURBS curve (the "sharpening" curve) defining the edge 206. In certain embodiments the desired NURBS curve (the "sharpening" curve) will be automatically derived from the surface using another method. For example, a user may implement a virtual 3D painting tool to mark a region of the virtual object for sharpening. A NURBS curve may be derived by the software based on the surface in the marked region. Alternatively, the user may simply select one or more objects in a virtual environment to be automatically sharpened according to embodiments of the invention.

Figure 3:
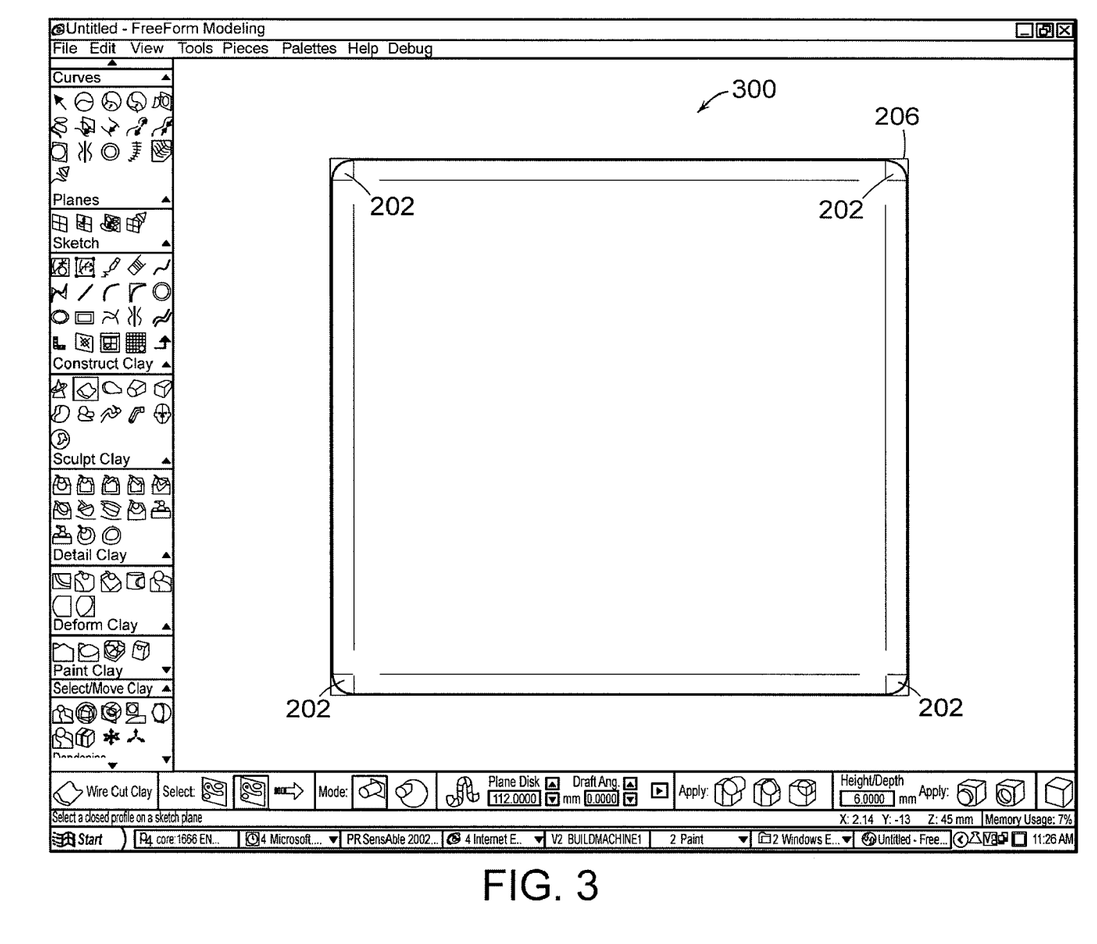
FIG. 3 is a screenshot from 3D haptic/graphical modeling software viewing the square-shaped end of the virtual object of FIG. 2.
Figure 4:
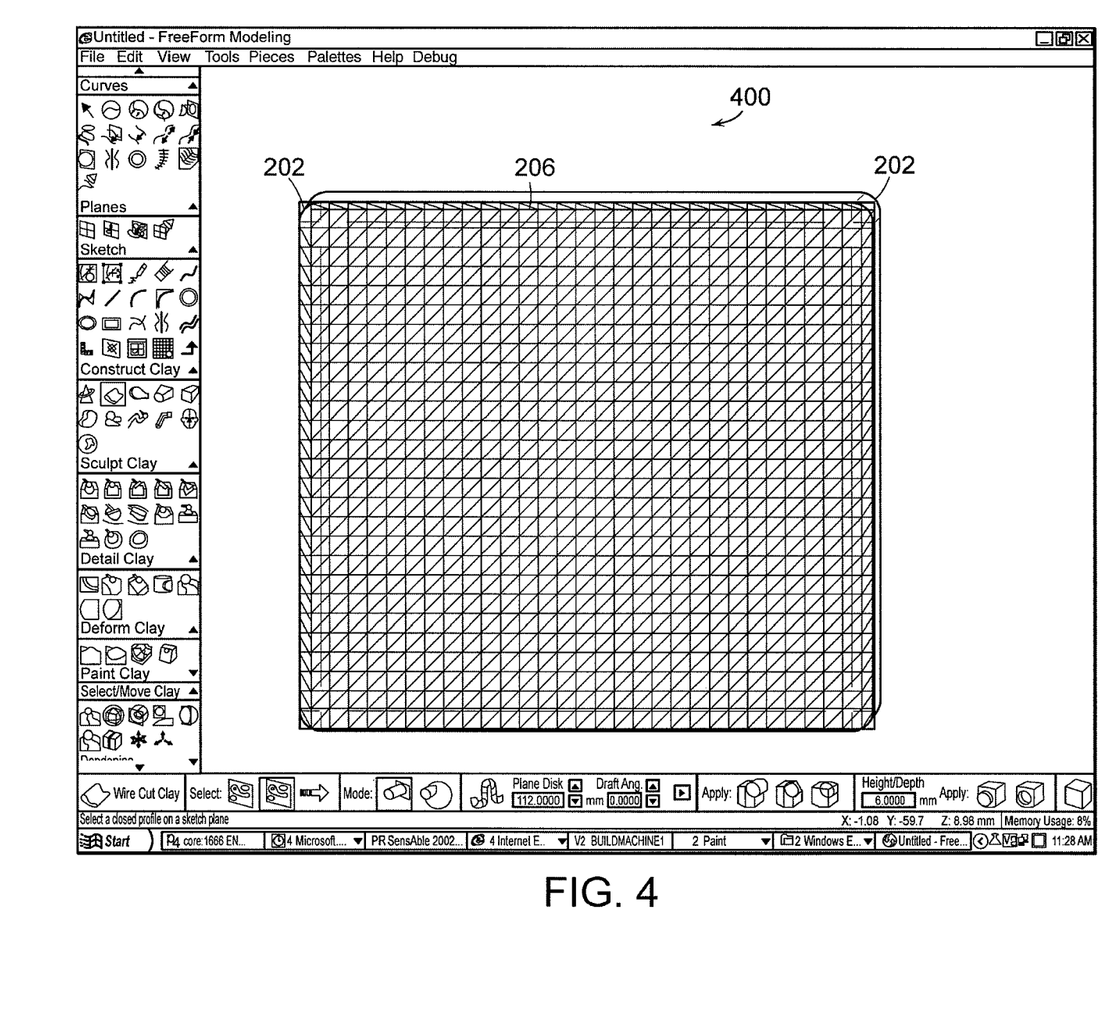
FIG. 4 is a screenshot from 3D haptic/graphical modeling software showing the beveled edges of a virtual object prior to execution of a process for sharpening the edges of the virtual object by creating a hybrid representation of the virtual object, in accordance with an illustrative embodiment of the invention.
Figure 5:
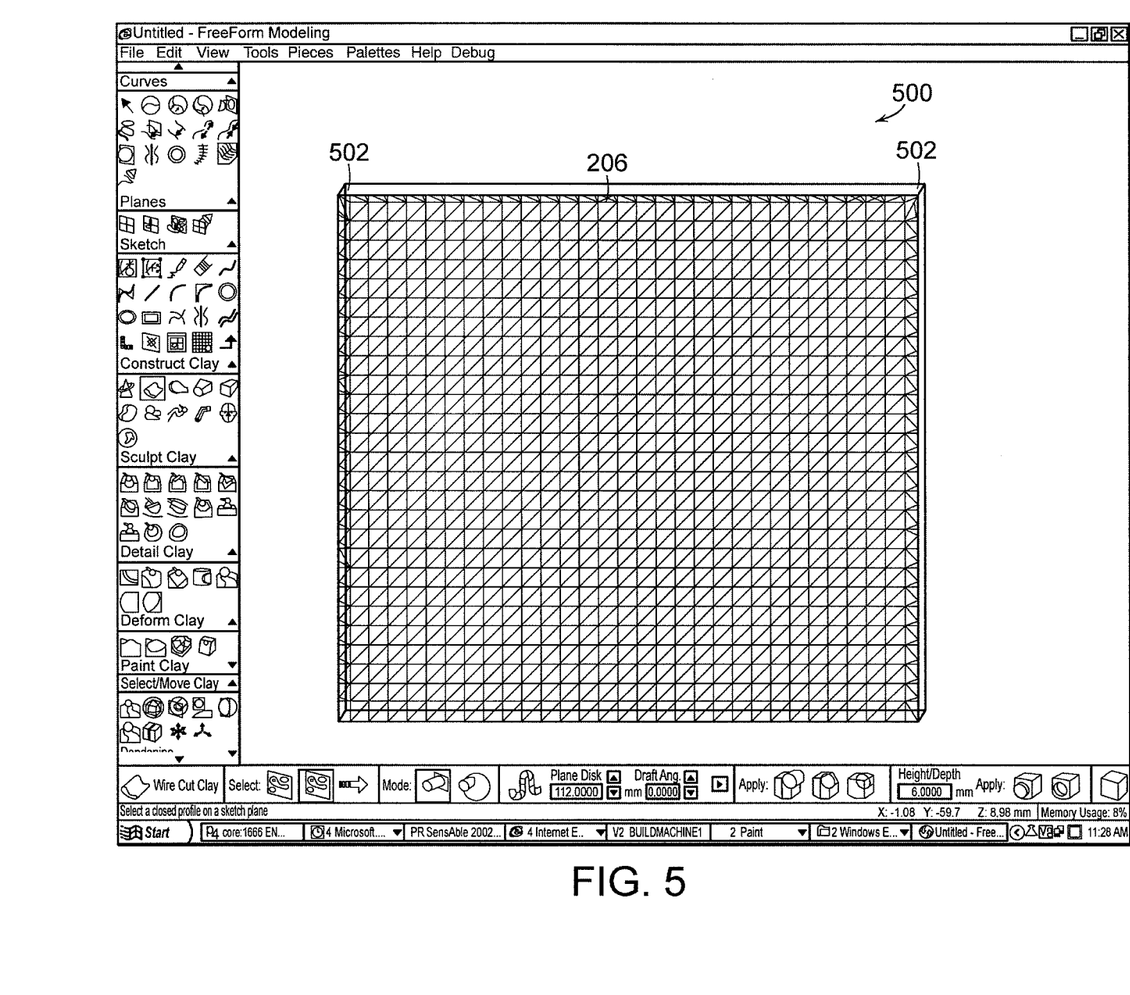
FIG. 5 is a screenshot from 3D haptic/graphical modeling software showing the geometric representation portion of an eventual hybrid model of a virtual object, in accordance with an illustrative embodiment of the invention.
Figure 6:
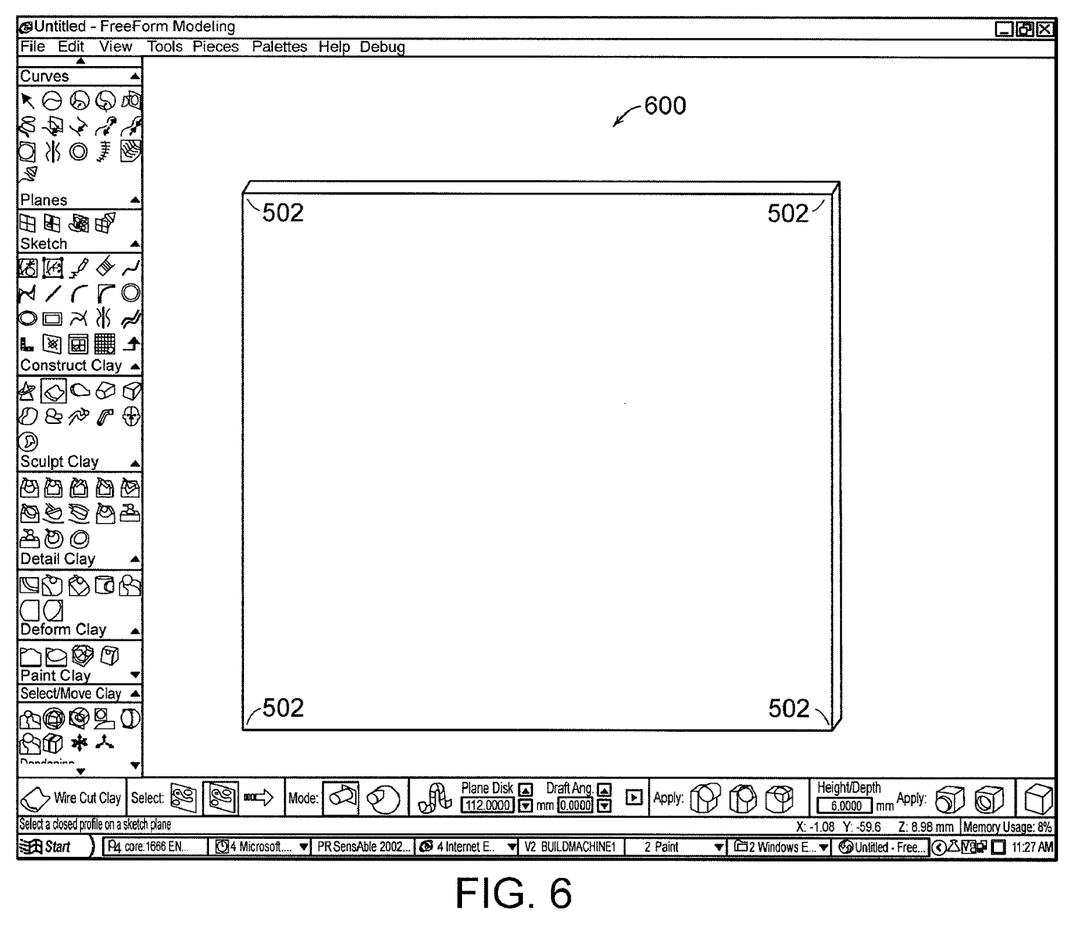
FIG. 6 is a screenshot from 3D haptic/graphical modeling software showing a hybrid representation of a 3D object including both a voxel-based portion and a geometric (e.g., NURBS) portion, in accordance with an illustrative embodiment of the invention.
Figure 7:
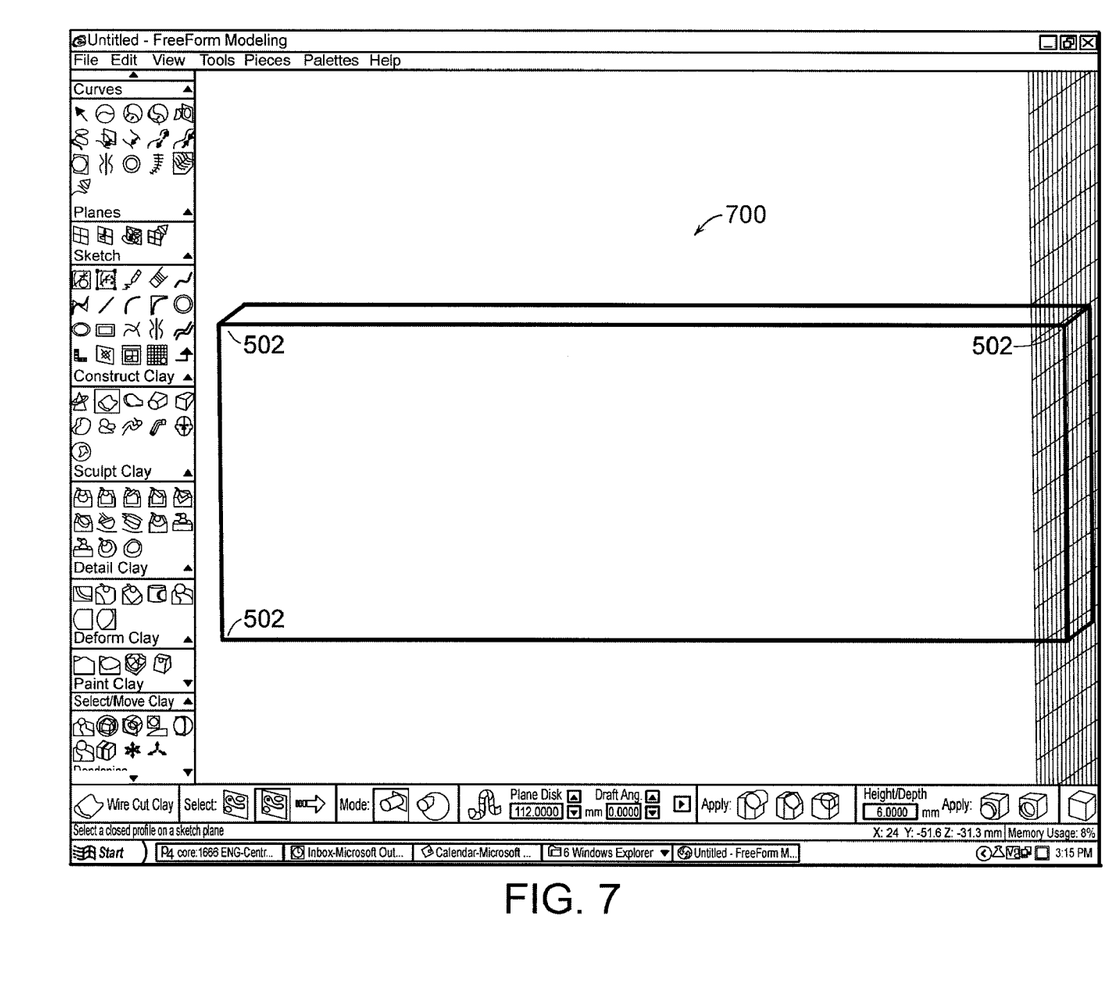
FIG. 7 is a screenshot from 3D haptic/graphical modeling software showing the hybrid representation of the 3D object of FIG. 6, viewed from a different angle, in accordance with an illustrative embodiment of the invention.
Figure 8:
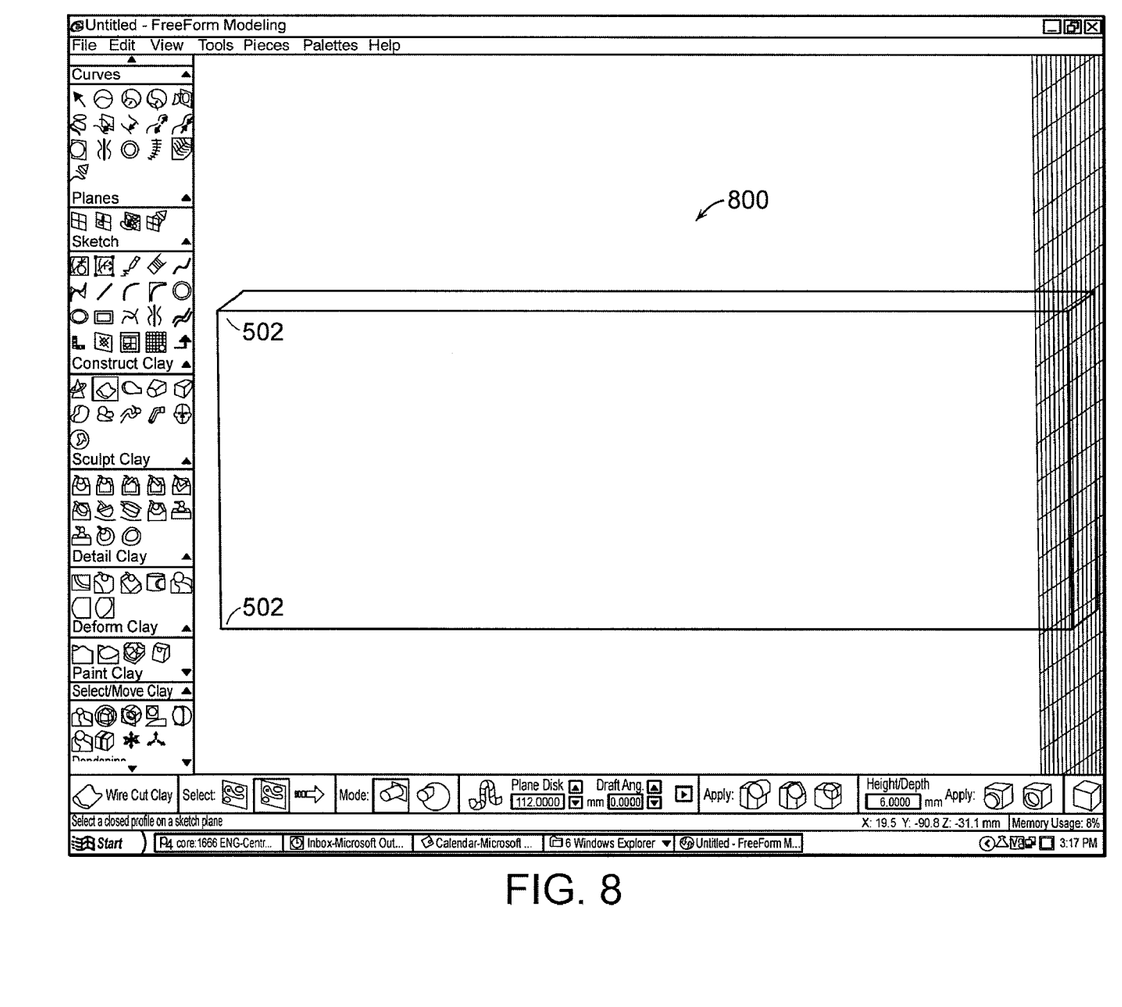
FIG. 8 is a screenshot from 3D haptic/graphical modeling software showing the hybrid representation of FIGS. 6 and 7, with the sharpening curves hidden from view, in accordance with an illustrative embodiment of the invention.

FIG. 3 shows a screenshot 300 viewing the square-shaped end of the virtual object of FIG. 2. FIG. 4 shows a screenshot 400 showing the sharpening curve 206 and the beveled edges of the virtual object, with the bevels seen most clearly at the corners 202. FIG. 5 shows a screenshot 500 of the geometric representation portion of the eventual hybrid model, consisting of the polygons 502 filling in the gap between the discrete voxel representation (the virtual clay surface) and the NURBS curve (the "sharpening" curve) defining the edge 206. FIG. 6 shows a screenshot 600 of the hybrid representation of the 3D object including the voxel-based representation portion and the geometric representation portion. FIG. 7 shows a screenshot 700 of the hybrid representation from a different angle. FIG. 8 shows a screenshot 800 of the hybrid representation with the sharpening curves hidden from view (to better view the clay).

The volumetric and geometric portions of the hybrid model can be interacted with, edited, sculpted, and/or otherwise manipulated seamlessly, without having to combine them in a post-process. Thus, a user can "feel" both the volumetric portion (e.g., the voxel-based portion) and the geometric portion (e.g., the triangles forming the edges). When the model is exported to STL, the voxels can be translated to triangles (or other polygons), for example, and the added triangles (the geometric portion) are also included in the exported data, maintaining the sharp edge.

In the example above, the purposes is to create an edge whose "sharpness" with respect to its resolution is higher than that of the quantized volumetrically-defined (e.g., voxel-based) solid to which the edge is attached. The user may have one or more ways to define the resolution-independent edge (e.g., by selecting a band of the volumetric solid with a virtual tool, such as a 3D painting tool, to derive an edge from a NURBS curve positioned just above the surface of the volumetric solid).

The system then connects the curve to the volumetrically-defined solid by a series of polygons (e.g. triangles) that tessellate the three-dimensional area connecting the geometric edge to the surface of the volumetrically-defined solid. In one embodiment, the invention generates triangular polygons by projecting a point from the curve to a triangular mesh representation of the voxel surface, splitting the mesh with a new point, "pulling" that point to the curve and adding the triangular polygons which ensue. Other embodiments employ different triangular polygon generation mechanisms depending on the desired cross-sectional shape of the sharp edge. The tessellating triangles form a polygonal mesh creating a closed surface.

The user may select any region of a resolution-independent geometry, resolution-dependent geometry, or quantified volumetric (e.g. voxel-based) representation for conversion to another geometry type. The system can stitch the geometry together accordingly so that the desired output representation remains a closed surface. The user has independent control over the type of boundary transition between the different types of surfaces/volumes.

The system can convert the hybrid representation created by the above-described operations into a uniform representation consisting of resolution-independent geometry, resolution-dependent geometry or quantized volumetric representation for output purposes consistent with the expectation of a specific output device.

In one embodiment, the system generates triangular polygons by projecting a point from the curve to a voxel surface, splitting the surface with a new point, "pulling" that point to the curve and adding the triangular polygons which ensue. Other embodiments employ different generation mechanisms depending on the desired cross-sectional shape of the sharp edge.

The boundary regions between the hybrid representations are transition regions. These boundary regions can be indicated by NURBS curves that fit to the surface regardless of the representation. The user can specify the width of the boundary region using either a fixed width for the entire boundary or variable width using secondary curves or control points. The user then specifies (or the software may determine) what type of geometric transition should occur, for example: a) a sharp transition; b) a transition that shares a common tangent; or c) a transition that shares a common center of curvature.

In certain embodiments, the invention allows the user to convert a hybrid of a resolution-independent geometric representation (e.g. NURBS) and a quantified volumetric representation into a single resolution-independent geometric representation. In this case, the resolution-independent representation (e.g., NURBS) is sliced by the user-defined boundary curve. The volumetric portion of the model is converted to the resolution-independent representation (e.g., NURBS representation), fit with the same boundary curve. Depending on the type of transition specified, the surfaces will have either a sharp or a gradual transition at the boundary curve. If the transition is gradual, additional transition geometry (e.g., a strip of NURBS patches) will be built to fit the geometry together. In either case the resulting geometry will be water tight.

In certain embodiments, the invention allows the user to convert a hybrid of a resolution-dependent geometric representation (e.g. triangular mesh) and a quantified volumetric representation into a single resolution-dependent geometric representation. In this case, a user-defined poly line curve will trim the resolution dependent representation. The voxel representation will be converted into a resolution-dependent geometric representation using an algorithm such as Marching Cubes. Both representations will be modified to fit to the bounding poly line. If a smoother transition is specified, the vertices of the transition area will be relaxed to produce the desired transition.

In certain embodiments, the invention allows the user to convert a voxel model into a NURBS representation providing a best fit to the surface. In other embodiments, the user is given control as to what degree of tolerance is used to match the NURBS representation to the voxel representation. In this case using a tool similar to 3d paint, a color can be applied to the voxel representation indicating how fine an amount of detail is converted into the NURBS representation. The same method can be used to specify a region to be very smooth. Like wise the addition of 3d NURBS curves for sharpening can be used for NURBS boundaries in the converted region.

In certain embodiments, the system allows the user to convert the hybrid representation to a wholly quantized representation by specifying the degree of quantization. This correlates to the size of the voxels used.

Figure 9:
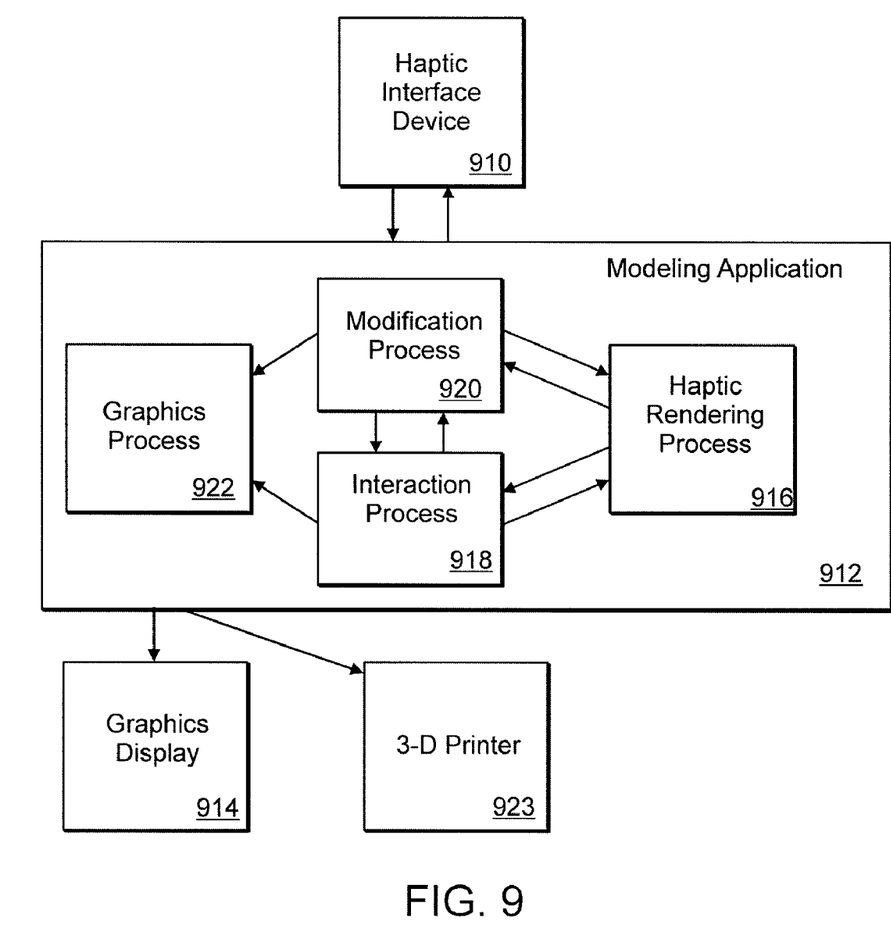
FIG. 9 is a functional block diagram of a system including a haptic interface device, modeling application (e.g., software and associated computer hardware), and graphics display, in accordance with an illustrative embodiment of the invention.

FIG. 9 shows a system for one embodiment of the invention, including a haptic interface device 910, modeling application 912, and graphics display 914 in electrical communication with each other. The modeling application 912 includes a haptic rendering process 916, a virtual tool and object interaction process 918, a virtual object modification process 920, a graphics process 922, and a 3-D printer 923 all in electrical communication with each other.

A user of the system uses the haptic interface device 910 to interact with the virtual object receiving force feedback produced by the haptic rendering process 916 and viewing graphics rendered by the graphics process 922 on a graphic display 914. The user may also output the virtual object, or a surface representation of it, to a 3-D printer 923 to produce an actual 3-D physical model of the virtual object.

In one embodiment, a "process", as referred to in FIG. 1, is a software process executing on a hardware microprocessor. All the processes may execute on one microprocessor, or in other embodiments, one or more processes may execute on different microprocessors, which are linked by buses, cables, local networks, wide area networks, or global computer networks, such as the Internet.

The modeling application 912 is viewed in FIG. 1 as a software application executing on one computer system. In another embodiment, the modeling application 912 executes on one or more computer systems connected by a communications device, such as a bus, cable, or network connection. In an alternate embodiment, the modeling application is a hardware device, such as an ASIC (application specific integrated circuit), and one or more processes of the application are implemented on one or more ASIC devices. In a further embodiment, the modeling application 912 is implemented as one or more objects, which may execute on one or more computer systems.

The modeling application 912 is not required to include all of a haptic rendering process 916, an interaction process 918, a modification process 920, and a graphics process 922, but may instead exclude one or more of these processes. In one embodiment, the modeling application 912 includes the haptic rendering process 916 and the graphics process 922.

In one embodiment, the invention is implemented using an object-oriented approach. The haptic rendering process 916 and other processes are implemented as software objects. In another embodiment, the virtual object and a virtual (software) tool are implemented as software objects and perform one or more of the functions of the haptic rendering process 916. In one embodiment, a virtual tool is a software object that performs such functions as determining if contact has occurred with a virtual object and determining the surface direction vector.

In one embodiment, the virtual object and the virtual tool are implemented as software objects in the C++ programming language. In other embodiments, the virtual object and virtual tool are implemented using an object-oriented programming language other than C++.

In one embodiment, the modeling application is (or includes) a computer program stored on a computer readable storage media, such as a CD disc, diskette, tape, or other media. In another embodiment, the modeling application is (or includes) a computer program distributed over a computer-readable propagated signal, such as a program distributed over the Internet.

Haptic Interface Device

In one embodiment, the system includes a haptic interface system, as shown in FIG. 9, including the haptic interface device 910 and the haptic rendering process 916 which generates a virtual object of the virtual environment to be "touched" and determines the results of the interaction (discussed in more detail below). The haptic interface device 910 is a tactile or force-feedback device which provides the touch sensations of interacting with virtual objects to a user of the system. Some haptic interface devices 910 include an electromechanical linkage which can exert a controllable force on a user's hand. See, for example, U.S. Pat. No. 5,625,576 issued to Thomas H. Massie and J. Kenneth Salisbury, Jr., the disclosure of which is herein incorporated by reference in its entirety. As used herein, "haptic rendering" refers to the creation of a virtual environment with which a user can interact through the sense of touch. The term "haptic rendering process" 916 refers to the computer program which generates the haptic aspects of the virtual environment and determines the forces to be applied to a user through a haptic interface. The haptic rendering process 916 generates haptic representations of virtual objects in the virtual environment.

Figure 10:
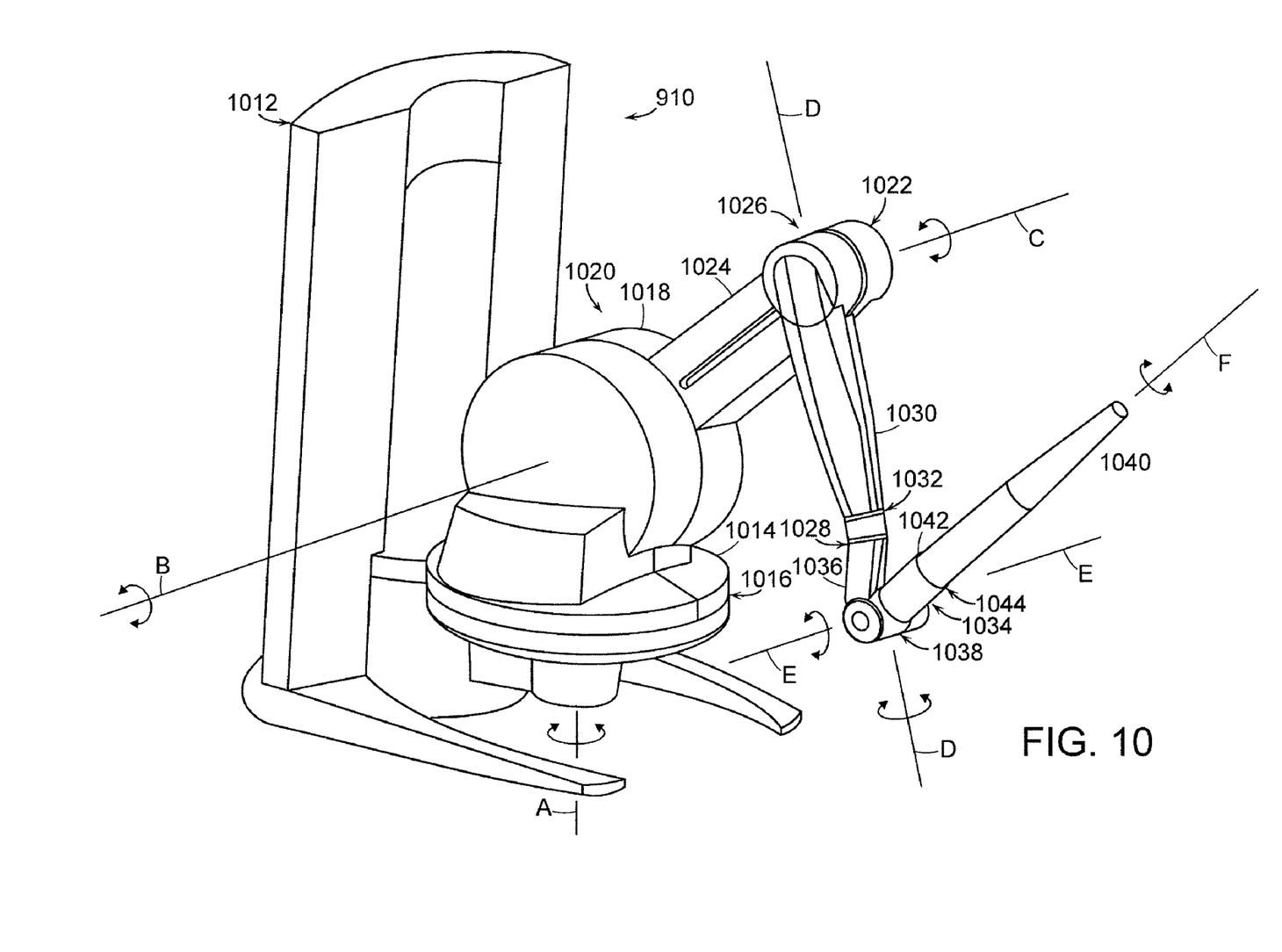
FIG. 10 is a schematic representation of a PHANTOM® force-feedback haptic interface device, in accordance with an illustrative embodiment of the invention.

FIG. 10 is a schematic perspective view 1000 of an exemplary six degree of freedom force reflecting haptic interface device 910 that can be used in accordance with one embodiment of the invention. The interface 910 can be used by a user to provide input to a device, such as a computer, and can be used to provide force feedback from the computer to the user. The six degrees of freedom of interface 910 are independent.

The interface 910 includes a housing 1012 defining a reference ground, six joints or articulations, and six structural elements. A first powered tracked rotary element 1014 is supported by the housing 1012 to define a first articulation 1016 with an axis "A" having a substantially vertical orientation. A second powered tracked rotary element 1018 is mounted thereon to define a second articulation 1020 with an axis "B" having a substantially perpendicular orientation relative to the first axis, A. A third powered tracked rotary element 1022 is mounted on a generally outwardly radially disposed extension 1024 of the second element 1018 to define a third articulation 1026 having an axis "C" which is substantially parallel to the second axis, B. A fourth free rotary element 1028 is mounted on a generally outwardly radially disposed extension 1030 of the third element 1022 to define a fourth articulation 1032 having an axis "D" which is substantially perpendicular to the third axis, C. A fifth free rotary element 1034 is mounted on a generally outwardly radially disposed extension 1036 of the fourth element 1028 to define a fifth articulation 1038 having an axis "E" which is substantially perpendicular to the fourth axis, D. Lastly, a sixth free rotary user connection element 1040 in the form of a stylus configured to be grasped by a user is mounted on a generally outwardly radially disposed extension 1042 of the fifth element 1034 to define a sixth articulation 1044 having an axis "F" which is substantially perpendicular to the fifth axis, E. The haptic interface of FIG. 10 is fully described in commonly-owned U.S. Pat. No. 6,417,638, issued on Jul. 9, 2002, which is incorporated by reference herein in its entirety. Those familiar with the haptic arts will recognize that there are many different haptic interfaces that convert the motion of an object under the control of a user to electrical signals, many different haptic interfaces that convert force signals generated in a computer to mechanical forces that can be experienced by a user, and haptic interfaces that accomplish both results.

The computer used in systems described herein can be a general purpose computer, such as a commercially available personal computer that includes a CPU, one or more memories, one or more storage media, one or more output devices, such as a display 914, and one or more input devices, such as a keyboard. The computer operates using any commercially available operating system, such as any version of the Windows™ operating systems from Microsoft Corporation of Redmond, Wash., or the Linux™ operating system from Red Hat Software of Research Triangle Park, N.C. In some embodiments, a haptic device such as the interface 910 is present and is connected for communication with the computer, for example with wires. In other embodiments, the interconnection can be a wireless or an infrared interconnection. The interface 910 is available for use as an input device and/or an output device. The computer is programmed with software including commands that, when operating, direct the computer in the performance of the methods of the invention. Those of skill in the programming arts will recognize that some or all of the commands can be provided in the form of software, in the form of programmable hardware such as flash memory, ROM, or programmable gate arrays (PGAs), in the form of hard-wired circuitry, or in some combination of two or more of software, programmed hardware, or hard-wired circuitry. Commands that control the operation of a computer are often grouped into units that perform a particular action, such as receiving information, processing information or data, and providing information to a user. Such a unit can comprise any number of instructions, from a single command, such as a single machine language instruction, to a plurality of commands, such as a plurality of lines of code written in a higher level programming language such as C++. Such units of commands are referred to generally as modules, whether the commands include software, programmed hardware, hard-wired circuitry, or a combination thereof. The computer and/or the software includes modules that accept input from input devices, that provide output signals to output devices, and that maintain the orderly operation of the computer. In particular, the computer includes at least one data input module that accepts information from the interface 910 which is indicative of the state of the interface 910 and its motions. The computer also includes at least one module that renders images and text on the display 914. In alternative embodiments, the computer is a laptop computer, a minicomputer, a mainframe computer, an embedded computer, or a handheld computer. The memory is any conventional memory such as, but not limited to, semiconductor memory, optical memory, or magnetic memory. The storage medium is any conventional machine-readable storage medium such as, but not limited to, floppy disk, hard disk, CD-ROM, and/or magnetic tape. The display 914 is any conventional display such as, but not limited to, a video monitor, a printer, a speaker, an alphanumeric display, and/or a force-feedback haptic interface device. The input device is any conventional input device such as, but not limited to, a keyboard, a mouse, a force-feedback haptic interface device, a touch screen, a microphone, and/or a remote control. The computer can be a stand-alone computer or interconnected with at least one other computer by way of a network, for example, a client/server network. This may be an internet connection.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims. Insofar as this is a provisional application, what is considered applicants' invention is not necessarily limited to embodiments that fall within the claims below.

What is claimed is:

1. A system for creating a hybrid representation of a three-dimensional object having one or more sharp edges, the system comprising:
   a user-controlled haptic interface device adapted to provide a user input to a computer and to transmit force to a user according to a user interface location in a virtual environment; and
   coded instructions that, when operating with said computer and said user input, are configured to:
   (a) generate a haptic representation of the three-dimensional object in said virtual environment, wherein said haptic representation is a hybrid representation comprising a volumetric portion and a geometric portion distinct from said volumetric portion, wherein said geometric portion defines at least one edge of said hybrid representation, and wherein the user can feel both the volumetric portion and the geometric portion; and
   (b) determine force transmitted to said user via said haptic interface device according to an interaction by said user with said three-dimensional object in said virtual environment.

2. The system of claim 1, wherein said volumetric representation comprises a voxel-based representation.

3. The system of claim 1, wherein said geometric representation comprises a resolution-independent geometric representation.

4. The system of claim 3, wherein said resolution-independent geometric representation comprises a NURBS representation.

5. The system of claim 1, wherein said geometric representation comprises a resolution-dependent geometric representation.

6. The system of claim 5, wherein said resolution-dependent geometric representation comprises at least one member selected from the group consisting of a polyline representation, a mesh representation, a polygon representation, and a polyhedral representation.

7. The system of claim 1, wherein said hybrid representation comprises polygons connected to a voxel representation to provide at least one sharp edge.

8. The system of claim 1, wherein said interaction comprises at least one of the following: creation of said three-dimensional object, manipulation of said three-dimensional object, interaction with said three-dimensional object, and editing of said three-dimensional object.

9. The system of claim 1, wherein said coded instructions are configured to:
(c) convert said hybrid representation into a wholly geometric representation for output to one or more members selected from the group consisting of a display device, a printer, and a fabricating device.

10. The system of claim 1, wherein said coded instructions are configured to:
(c) convert said hybrid representation into a wholly volumetric representation for output to one or more members selected from the group consisting of a display device, a printer, and a fabricating device.

11. The system of claim 1, wherein said coded instructions are further configured to:
(c) display said hybrid representation; and/or
(d) provide output data for printing and/or fabrication of said hybrid representation.

12. An apparatus for creating a hybrid representation of a three-dimensional object, the apparatus comprising:
a haptic interface device;
a memory upon which machine-readable code is stored, the code defining a set of instructions for:
(a) generating a haptic representation of the three-dimensional object in a virtual environment, wherein said haptic representation is a hybrid representation comprising a volumetric portion and a geometric portion distinct from said volumetric portion, wherein said geometric portion defines at least one edge of said hybrid representation, and wherein a user can feel both the volumetric portion and the geometric portion; and
(b) determining force transmitted to a user via said haptic interface device according to an interaction by said user with said three-dimensional object in said virtual environment.

13. The apparatus of claim 12, wherein said volumetric representation comprises a voxel-based representation.

14. The apparatus of claim 12, wherein said geometric representation comprises a resolution-independent geometric representation.

15. The apparatus of claim 14, wherein said resolution-independent geometric representation comprises a NURBS representation.

16. The apparatus of claim 12, wherein said geometric representation comprises a resolution-dependent geometric representation.

17. The apparatus of claim 16, wherein said resolution-dependent geometric representation comprises at least one member selected from the group consisting of a polyline representation, a mesh representation, a polygon representation, and a polyhedral representation.

18. The apparatus of claim 12, wherein said hybrid representation comprises polygons connected to a voxel representation to provide at least one sharp edge.

19. The apparatus of claim 12, wherein said interaction comprises at least one of the following: creation of said three-dimensional object, manipulation of said three-dimensional object, interaction with said three-dimensional object, and editing of said three-dimensional object.

20. The apparatus of claim 12, wherein said code defines a set of instructions for:
(c) converting said hybrid representation into a wholly geometric representation for output to one or more members selected from the group consisting of a display device, a printer, and a fabricating device.

21. The apparatus of claim 12, wherein said code defines a set of instructions for:
(c) converting said hybrid representation into a wholly volumetric representation for output to one or more members selected from the group consisting of a display device, a printer, and a fabricating device.

22. The apparatus of claim 12, wherein said code defines a set of instructions for:
(c) displaying said hybrid representation; and/or
(d) providing output data for printing and/or fabrication of said hybrid representation.

\* \* \* \* \*